(12) United States Patent
Lin et al.

(10) Patent No.: US 11,163,375 B1
(45) Date of Patent: Nov. 2, 2021

(54) SLIDER STRUCTURE FOR A MECHANICAL KEYBOARD

(71) Applicant: Logitech Europe S.A., Lausanne (CH)

(72) Inventors: Feng-Hao Lin, Hsinchu (TW); Kuan Chieh Liang, Zhubei (TW); Yu-Chun Sun, Taipei (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/137,238

(22) Filed: Dec. 29, 2020

(51) Int. Cl.
*G06F 3/02* (2006.01)
*H01H 3/12* (2006.01)

(52) U.S. Cl.
CPC .......... *G06F 3/0205* (2013.01); *H01H 3/122* (2013.01)

(58) Field of Classification Search
CPC ....... G06F 3/0205; H01H 13/14; H01H 3/122
USPC ....................................................... 345/156
See application file for complete search history.

(56) References Cited

U.S. PATENT DOCUMENTS

| 10,431,402 | B2 * | 10/2019 | Hsieh | H01H 13/04 |
| 10,910,172 | B2 * | 2/2021 | Wu | H01H 3/125 |
| 2013/0015986 | A1 * | 1/2013 | Lu | G06F 1/1662 341/32 |
| 2017/0221653 | A1 * | 8/2017 | Liao | H01H 13/023 |
| 2017/0308178 | A1 * | 10/2017 | Huang | G06F 3/0216 |

\* cited by examiner

*Primary Examiner* — Calvin C Ma
(74) *Attorney, Agent, or Firm* — Kilpatrick Townsend & Stockton LLP

(57) ABSTRACT

A slider structure for a keyboard comprising a housing, a depressible actuator disposed in the housing, and a chambered track configured to receive a balance bar structure, the balance bar structure operable to provide a structural support that resists a key cap coupled to the frame from tilting as a force applied at any point on the top surface of the key cap. When the depressible actuator is depressed, the depressible actuator is operable to push the balance bar structure causing the balance bar structure to rotate within the chambered track. The frame and depressible actuator are comprised of a rigid material and the chambered track is comprised of a compliant material that attenuates sound caused by the rotating of the balance bar structure within the chambered track.

20 Claims, 10 Drawing Sheets
(6 of 10 Drawing Sheet(s) Filed in Color)

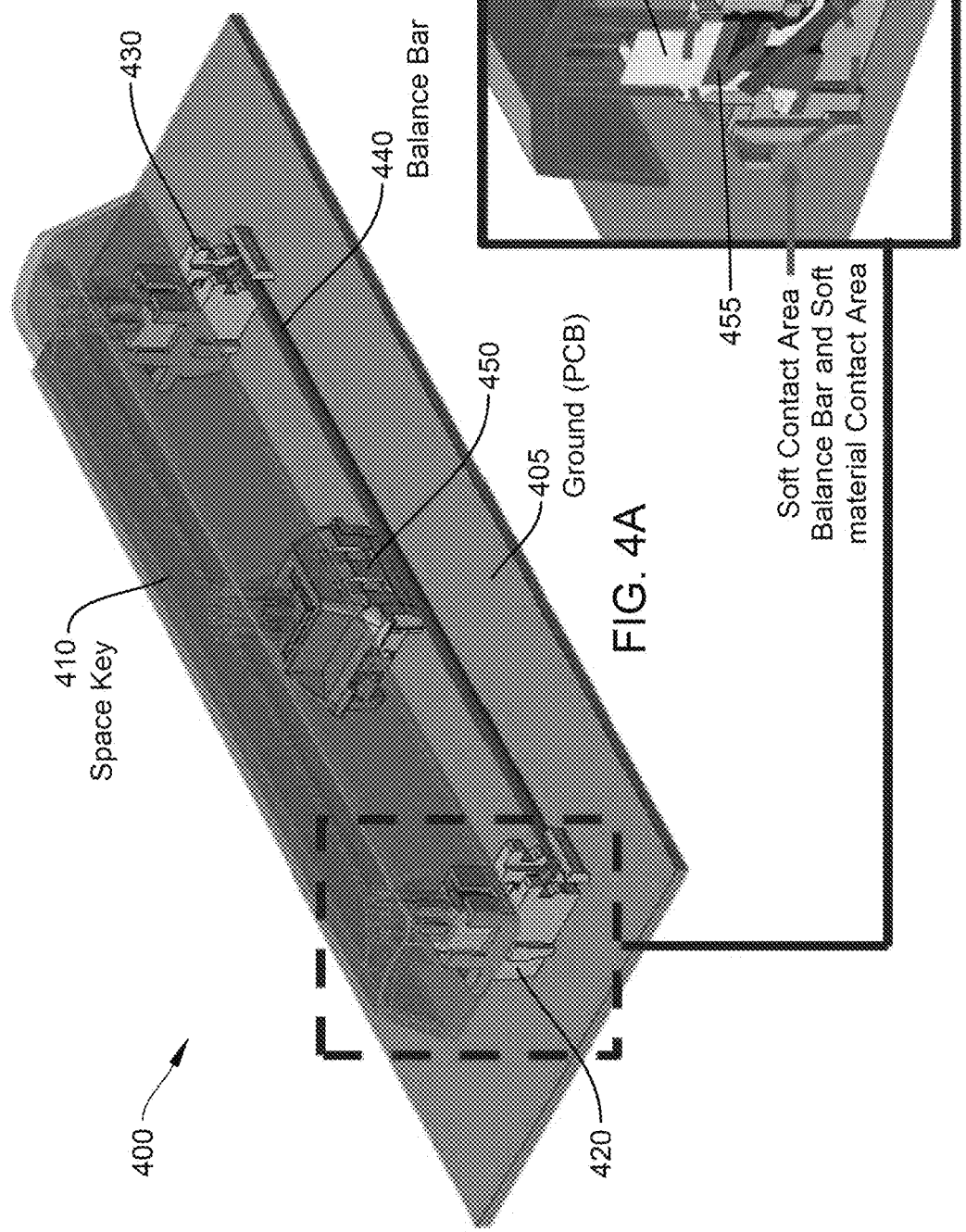
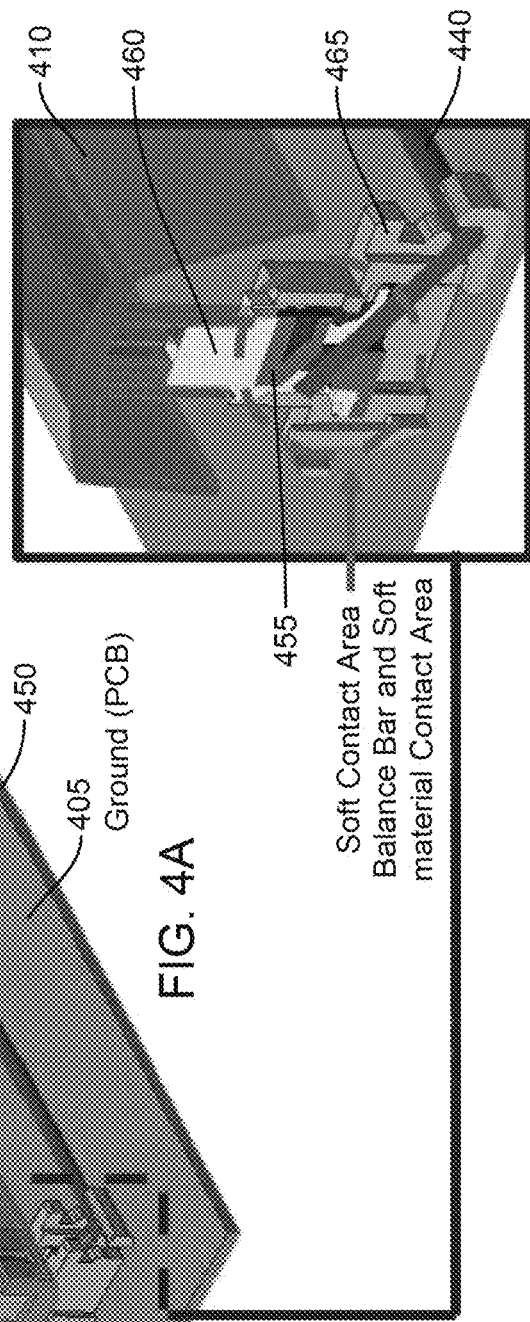
FIG. 4A
FIG. 4B

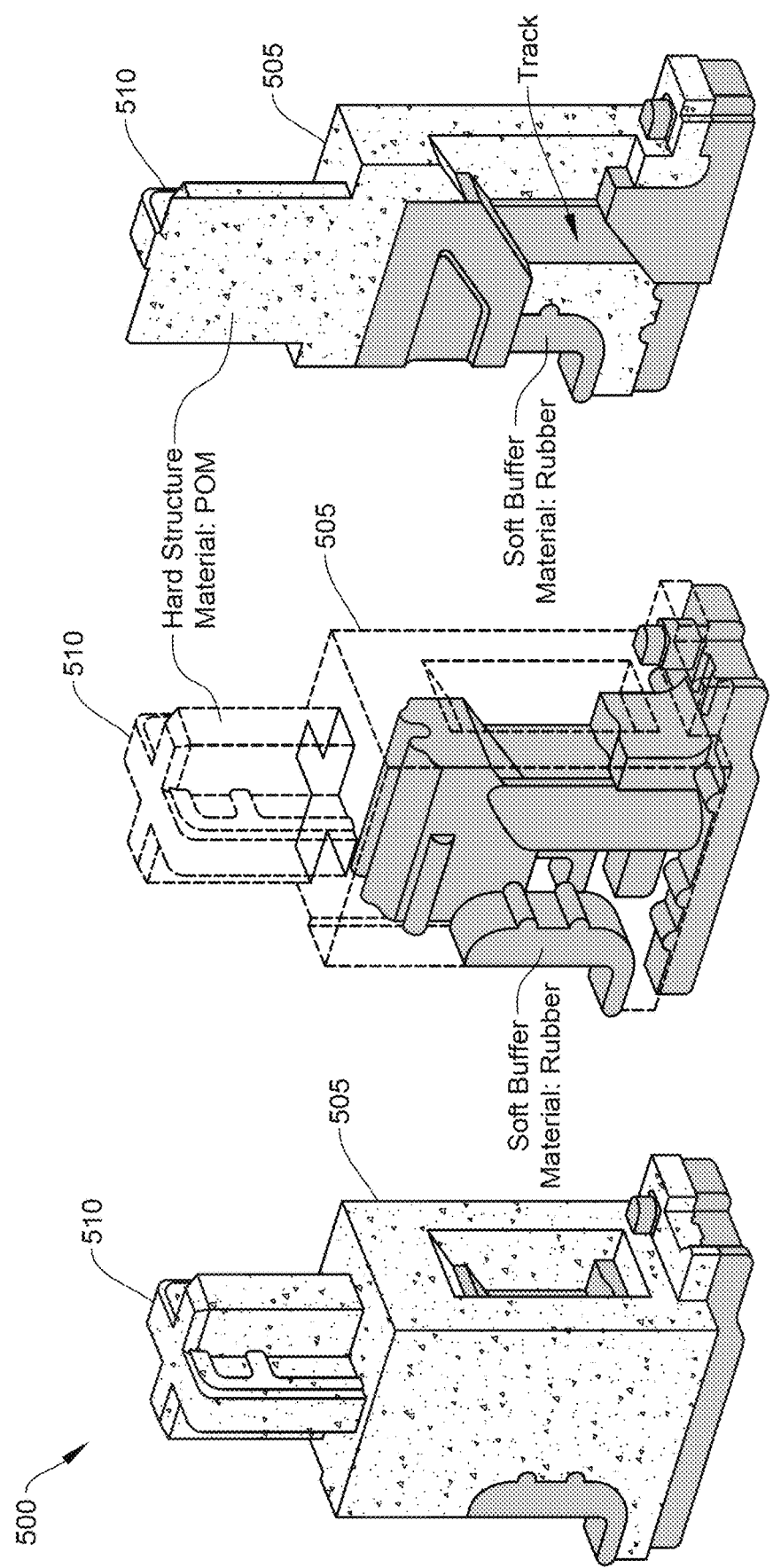

SLIDER STRUCTURE FOR A MECHANICAL KEYBOARD

BACKGROUND

Keyboards are the quintessential input device that has been used for manual data input (e.g., typing) for over a century and remain a primary input device still used in contemporary computing systems such as desk tops, laptops, smart devices, and the like. Keyboards typically use mechanical keys, which have been subject to many improvements in quality and longevity over the years. Keyboards typically include a key cap coupled to a key switch that generates data (e.g., alphanumeric characters) when the key switch is depressed beyond a threshold distance.

Key switches may include scissor type, butterfly type, dome type, or the like, and may be adapted to provide a mechanical feedback as the key is depressed to achieve a particular user-preferred operation. For instance, some keys can be configured to feel "springy," "clicky," "soft," or the like, to accommodate many different uses (e.g., gaming, office use, etc.) and preferences. Furthermore, keyboards are substantially more robust with some key structures (e.g., mechanical/galvanic) having operating life spans of millions of clicks before failure, and some types (e.g., contactless optical key structure) being capable of greater longevity.

Keyboard functionality has also greatly improved with better operation function (e.g., function keys, macros, touch sensitive keys, programmable keys, etc.), improved user experience (e.g., individual key lighting), and ergonomic improvements (e.g., split keyboards, keyboard rotation, etc.), and more. Despite these many improvements, mechanical keyboards continue to be relatively noisy, which can be an issue in certain environments (e.g., office, library, video conferencing, etc.). More improvement is needed in this area.

It should be noted that unless otherwise indicated herein, the materials described in this section are not prior art to the claims in this application and are not admitted to be prior art by inclusion in this section.

SUMMARY OF THE INVENTION

In certain embodiments, a keyboard comprises a key frame and a key structure coupled to the key frame, the key structure including a key cap having a top surface and bottom surface opposite the top surface, a depressible key switch coupled to the bottom surface of the key cap, a depressible first slider having a first track and the first slider coupled to the bottom surface of the key cap, and a depressible second slider having a second track and the second slider coupled to the bottom surface of the key cap. In some aspects, each of the first and second sliders can include a first portion comprised of a rigid material (e.g., polyoxymethylene ("POM") and a second portion comprised of a compliant material (e.g., rubber). The key structure can further include a balance bar structure including a first end coupled to the first slider and configured to rotate within the first track as the key structure is depressed or released and a second end coupled to the second slider and configured to rotate within the second track as the key structure is depressed or released. The balance bar structure can be configured to provide a structural support that prevents the key cap from tilting as the key structure is depressed in response to a force applied at any point on the top surface of the key cap. When the key structure is fully depressed, the key cap can impact a bottom region of the second portion of each of the first and second sliders. The compliant material absorbs energy from the impact such that a first sound (e.g., the key "click" sound) caused by the impact of the key cap with the bottom region is attenuated.

In some cases, the first track is a mid-region of the second portion of the first slider, wherein the second track is a mid-region of the second portion of the second slider, and the compliant material attenuates sound caused by the rotating of the balance bar structure within the first and second tracks. A biasing mechanism of the depressible key switch may provide a restoring force configured to cause the key cap and the balance bar structure to return from a depressed state to an unpressed state, where the balance bar structure impacts an upper region of the second portion of the first and second sliders when the balance bar structure returns from the depressed state to the unpressed state, and the compliant material attenuates sound caused by the impact of the balance bar structure against the upper region of the second portion of the first and second sliders when the balance bar structure returns from the depressed state to the unpressed state. In some aspects, the key switch is centered under the key cap, the first slider is positioned at a first end of the key cap, and the second slider is positioned at a second end of the key cap, the first and second sliders being substantially equidistant from the key switch (e.g., Cherry key switch). In some implementations, the first portion and the second portion of the first and second sliders is formed via a dual shot injection molding process, a 3D printing process, or other suitable method. In some cases, a lubricant (e.g., grease) can be disposed in the first and second tracks to further reduce friction of the balance bar as it moves (e.g., rotates, slides, etc.) within the tracks. In some aspects, any suitable grease or lubricant can be used that can reduce friction and vibration noise, and may include composites with additional materials (e.g., Teflon®) to improve chemical resistance properties.

In some embodiments, a key structure for a keyboard comprises a key cap having a top surface and bottom surface opposite the top surface, a depressible first slider having a first track where the first slider is coupled to the bottom surface of the key cap, a depressible second slider having a second track where the second slider is coupled to the bottom surface of the key cap, and each of the first and second sliders include a first portion comprised of a rigid material (e.g., POM) and a second portion comprised of a compliant material (e.g., rubber). The key structure can further comprise a balance bar structure including a first end coupled to the first slider and configured to rotate within the first track as the key structure is depressed or released and second end coupled to the second slider and configured to rotate within the second track as the key structure is depressed or released. The balance bar structure can be configured to provide a structural support that prevents the key cap from tilting as the key structure is depressed in response to a force applied at any point on the top surface of the key cap. When the key structure is fully depressed, the keycap impacts a bottom region of the second portion of each of the first and second sliders, and the compliant material absorbs energy from the impact such that a first sound caused by the impact of the key cap with the bottom region is attenuated.

In some aspects, the first track is a mid-region of the second portion of the first slider, the second track is a mid-region of the second portion of the second slider, and the compliant material attenuates sound caused by the movement (e.g., rotation, sliding, etc.) of the balance bar structure within the first and second tracks. In some cases, a biasing mechanism of a depressible key switch coupled to the key cap provides a restoring force configured that causes the key cap and the balance bar structure to return from a depressed state to an unpressed state, where the balance bar structure impacts an upper region of the second portion of the first and second sliders when the balance bar structure returns from the depressed state to the unpressed state and the compliant material attenuates sound caused by the impact of the balance bar structure against the upper region of the second portion of the first and second sliders when the balance bar structure returns from the depressed state to the unpressed state.

In further embodiments, a slider structure for a keyboard comprises a frame, a depressible actuator disposed in the frame, and a chambered track configured to receive a balance bar structure, the balance bar structure operable to provide a structural support that resists a key cap coupled to the frame from tilting as a force applied at any point on the top surface of the key cap. When the depressible actuator is depressed, the depressible actuator may be operable to push the balance bar structure causing the balance bar structure to rotate within the chambered track, where the frame and depressible actuator are comprised of a rigid material (e.g., POM) and the chambered track is comprised of a compliant material (e.g., rubber) that attenuates sound caused by the rotating of the balance bar structure within the chambered track. In some aspects, when the depressible actuator is fully depressed, the keycap impacts a base structure comprised of the compliant material and the compliant material of the base structure absorbs energy from the impact such that a sound caused by the impact of the key cap with the base structure is attenuated. In some aspects, a biasing mechanism of a depressible key switch coupled to the key cap provides a restoring force configured to cause the key cap and the balance bar structure to return from a depressed state to an unpressed state, where the balance bar structure impacts a region of the chambered track when the balance bar structure returns from the depressed state to the unpressed state, and where the compliant material attenuates sound caused by the impact of the balance bar structure against the region of the chambered track when the balance bar structure returns from the depressed state to the unpressed state.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The features of the various embodiments described above, as well as other features and advantages of certain embodiments of the present invention will be more apparent from the following detailed description taken in conjunction with the accompanying drawings, in which:

FIG. 4A shows a key structure incorporating an improved balance bar structure, according to certain embodiments;

FIG. 4B shows a blown up cross-section of a slider structure, according to certain embodiments;

FIGS. 5A-5C show a close up, translucent, and cutaway view of a slider structure, respectively, according to certain embodiments;

Throughout the drawings, it should be noted that like reference numbers are typically used to depict the same or similar elements, features, and structures.

DETAILED DESCRIPTION

Figure 1:
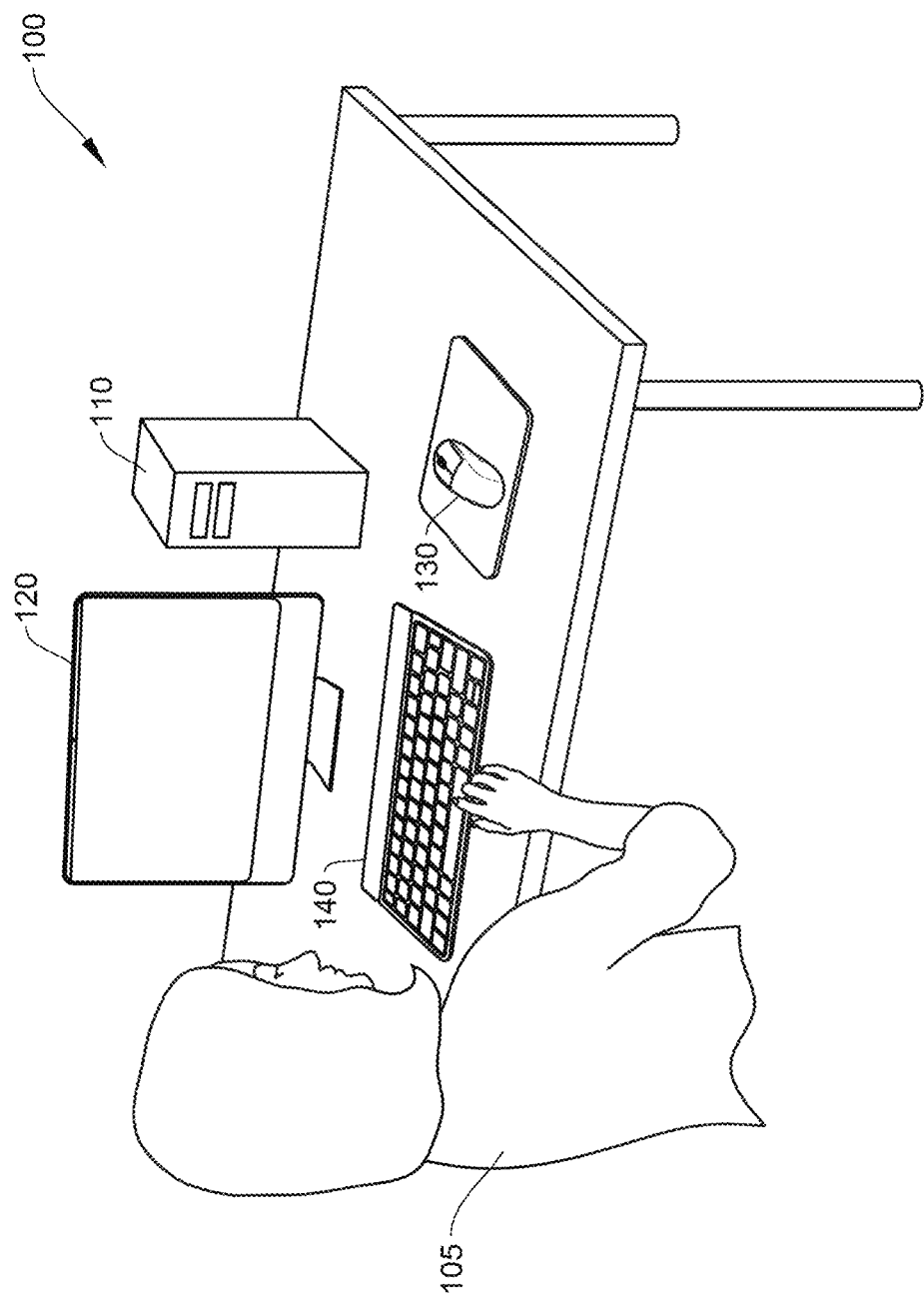
FIG. 1 shows an example of a computer system that can include any of a variety of host computing devices and computer peripheral devices, including peripheral devices that can be configured to include aspects of the various inventive concepts described herein.

Aspects of the present disclosure relate generally to input devices, and more particularly to computer peripheral devices with a mechanical keyboard, according to certain embodiments.

In the following description, various examples of keyboard systems and mechanical key structures are described. For purposes of explanation, specific configurations and details are set forth in order to provide a thorough understanding of the embodiments. However, it will be apparent to one skilled in the art that certain embodiments may be practiced or implemented without every detail disclosed.

Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to mechanical keyboards and corresponding key structures that operate to reduce mechanical noise, such as the audible "clicks" typically heard when a user presses a key on a mechanical keyboard. The audible clicks of standard-sized keys (e.g., the "asdf" keys) in a typical alphanumeric keyboard is primarily due to the key switch. Many contemporary keyboards employ Cherry key switches, which have industry standard performance characteristics, such as a preferred force profile (e.g., the "feel" of the key press) and operational longevity. Some contemporary key switches are "silent" key switches that have a markedly reduced mechanical sound profile (e.g., click noise). However, despite these improvements in key switch sound profiles, larger keys (e.g., space bar, tab, caps lock, shift, control, alt, enter, backspace, etc.) can employ other mechanical components for key stability that are significant contributors to key noise and often louder than key switch noise.

In large mechanical keys, such as a space bar, a balance bar structure can be used to provide structural support to the key to prevent it from tilting (e.g., like a seesaw) when the key is pressed on one end of the key cap or the other. The structural support can include two slider structures that support the balance bar in internal tracks that allow the balance bar to rotate within the tracks and move up and down as the key is depressed. An example of an architectural arrangement of such a key structure is shown in FIG. 4A-4C. As the key is depressed, the movement of the balance bar within the tracks and the impact of the various structures against surfaces can significantly contribute to key noise.

In certain embodiments, the slider structures can be manufactured to include portions that are comprised of a rigid material for structural support (e.g., polyoxymethylene (POM)), and portions that are comprised of compliant material (e.g., rubber) to absorb impact and attenuate sound at locations where these problematic sources of noise occur. Aspects of this invention are directed to reducing noise caused at three locations in the slider structures, which can result in substantially quieter keys. A first source of key noise is typically caused by the keycap impacting a bottom surface, which may be a key frame, PCB, or other base structure. In some embodiments, the slider structure can include a base structure comprised of the compliant material that is oriented such that the key cap impacts the base structure when the key is depressed instead of impacting a different harder surface (e.g., key frame, PCB). The compliant material of the base structure can significantly attenuate the impact noise and reduce the overall key noise, as further described below with respect to FIGS. 4-7C.

Another source of key noise can be caused by the balance bar moving and rotating inside the track of the slider structures, which impacts various points inside the track. In some embodiments, the track may be comprised of the compliant material, which can attenuate sounds associated with the moving and rotating of the balance bar in the track, as further described below with respect to FIGS. 4A-7C.

A third source of key noise can be caused by the rebound of the key back to its undepressed state. When the key rebounds, the balance bar structure may impact a region of the chambered track when the balance bar structure returns from the depressed state to the unpressed state. The noise associated with this impact can be substantially reduced if the impact location includes the compliant material, as further described below with respect to FIGS. 4-7C. Thus, the typical sources of the most noise in a key structure utilizing a balance bar architecture can be substantially reduced by incorporating a compliant material at locations where impacts, rubbing, rotating, or other mechanical contacting occurs. Embodiments incorporating compliant material in all three locations can result in key noise for a large key (e.g., space bar, tab key, backspace, shift key, etc.) with a balance bar architecture to be more attenuated than key noise in a standard key, as further described below with respect to the graphs of FIGS. 8-10B.

The novel concepts (e.g., key structures) described herein are typically described and depicted for use in a computer keyboard, however these novel concepts can be applied to any input device that incorporates balance bar key structures, as would be appreciated by one of ordinary skill in the art with the benefit of this disclosure. In some cases, the slider structures may be manufactured using a dual shot injection molding process (e.g., first shot for the rigid material, second shot for the compliant material), using a 3D printing methodology, or the like. In some cases, other materials can be used to further improve (reduce) noise characteristics of the key press including the addition of grease in the chambered track, or the use of a non-metal material for the balance bar or coating thereof for reduced friction and/or impact (e.g., rigid plastic, rubber/plastic sleeve on the balance bar, etc.).

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

FIG. 1 shows an example of a computer system 100 that can include any of a variety of host computing devices and computer peripheral devices, including peripheral devices (e.g., a keyboard, computer mouse, etc.), that can be configured to include aspects of the various inventive concepts described herein. Computer system 100 shows a user 105 operating a host computing device (shown as a desktop computer) 110 and a number of computer peripheral devices communicatively coupled to host computing device 100, including a display device 120, a computer mouse 130, and keyboard 140, and may include any other suitable computer peripheral device.

Although the host computing device is shown as a desktop computer, other types of host computing devices can be used including gaming systems, laptop computers, set top boxes, entertainment systems, tablet or "phablet" computers, stand-alone head mounted displays (HMDs), or any other suitable host computing device (e.g., smart phone, smart wearable, internet-of-things (IoT) devices, or the like). In some cases, multiple host computing devices may be used and one or more of the computer peripheral devices may be communicatively coupled to one, some, or all of the host computing devices (e.g., a computer keyboard may be coupled to multiple host computing devices). A host computing device may also be referred to herein as a "host computer," "host device," "computing device," "computer," or the like, and may include a machine readable medium (not shown) configured to store computer code, such as driver software, firmware, and the like, where the computer code may be executable by one or more processors of the host computing devices(s) to control aspects of the host computing device, for instance via the one or more computer peripheral devices.

A typical computer peripheral device can include any suitable input device, output device, or input/output device including those shown (e.g., a computer keyboard) and not shown (e.g., game controller, HMD, etc.), AR/VR controller, a CAD controller, joystick, simulation shifter, stylus device, or other suitable device) that can be used, for example, to convert analog inputs into digital signals for computer processing. By way of example, a computer peripheral device (e.g., keyboard 140) can be configured to provide control signals for input detection (e.g., alphanumeric input, knob/wheel movement, etc.), output functions (e.g., LED control, haptic feedback, displays, etc.), or any of myriad other features that can be provided by ah computer peripheral device, as would be appreciated by one of ordinary skill in the art with the benefit of this disclosure.

A computer peripheral device may be referred to as an "input device," "peripheral input device," "peripheral device," "computer input device," "user interface device," "control device," "input unit," or the like. The majority of the embodiments described herein generally refer to computer peripheral device 140, however it should be understood that a computer peripheral device can be any suitable input/output (I/O) device (e.g., user interface device, control device, input unit, or the like) that may be adapted to utilize the novel embodiments described and contemplated herein, such as the implementation of sliders and a balance bar for key stability that incorporates certain materials (e.g., compliant rubber) to attenuate key press noises (e.g., key cap impacts, balance bar sliding and/or impact, etc.), as further described below at least with respect to FIGS. 4-10B.

Typical System Embodiment for Operating an Input Device

Figure 2:
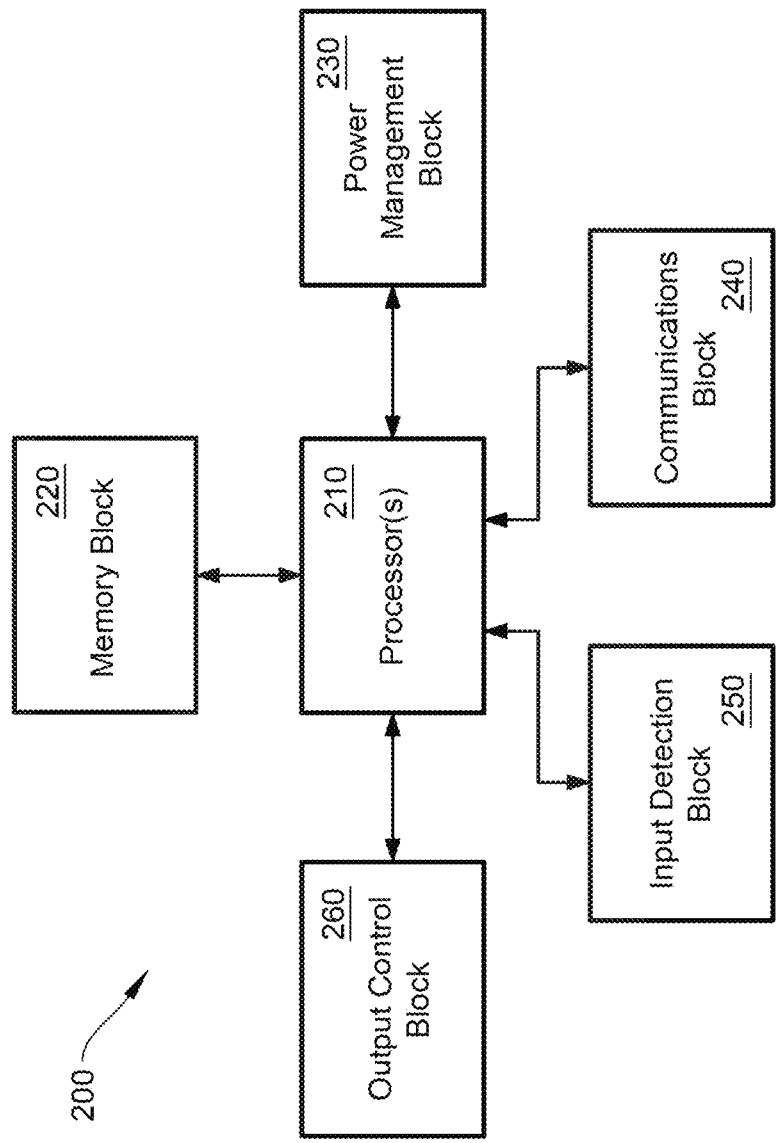
FIG. 2 shows a simplified block diagram of a system to operate and input device, according to certain embodiments.

FIG. 2 shows a simplified block diagram of a system 200 to operate input device 140, according to certain embodiments. System 200 may include processor(s) 210, memory block 220, power management block 230, communications block 240, input detection block 250, and output control block 260. Each of system blocks 220-260 can be in electrical communication with processor(s) 210. System 200 may further include additional systems that are not shown or described to prevent obfuscation of the novel features described herein. System blocks 220-260 (also referred to as "modules") may be implemented as separate modules, or alternatively, more than one system block may be implemented in a single module. In the context described herein, system 200 can be incorporated into any computer peripheral device that incorporates the novel key structures described herein, such as those described below with respect to FIGS. 4-10B.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 140 (e.g., system blocks 220-260). Alternatively or additionally, some of system blocks 220-260 may include an additional dedicated processor, which may work in conjunction with processor(s) 210. For instance, MCUs, µCs, DSPs, and the like, may be configured in other system blocks of system 200. Communications block 240 may include a local processor, for instance, to control aspects of communication with computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. In some implementations, processor 302 of FIG. 3 may work in conjunction with processor 210 to perform some or all of the various computer peripheral device functions described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block 220 can include a data storage subsystem, according to certain embodiments. A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory (e.g., random access memory) during program execution. From a storage subsystem, processing devices can retrieve program instructions to execute in order to execute various operations (e.g., software-controlled programming of keyboard key functionality, etc.) as described herein.

Power management block 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management block 230 may be incorporated into processor(s) 210. Alternatively, some embodiments may not include a dedicated power management block. For example, functional aspects of power management block 230 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communications block 240 can be configured to enable wireless communication with a corresponding host computing device (e.g., 110), or other devices and/or peripherals, according to certain embodiments. Communication block 240 can be configured to provide radio-frequency (RF), Bluetooth®, Logitech proprietary communication protocol (e.g., Unifying, Gaming Light Speed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, etc.). In some aspects, communication block 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication block 240 may incorporate one or more antennas, oscillators, etc., and may operate at any suitable frequency band (e.g., 2.4 Ghz), etc. One of ordinary skill in the art with the benefit of this disclosure would appreciate the many modifications, variations, and alternative embodiments thereof.

Input detection block 250 can control the detection of a user-interaction with input elements (also referred to as "input members") on computer peripheral device 140. Input detection block 250 can detect user inputs from keys (e.g., alphanumeric keys, function keys, or other key type), motion sensors, buttons, roller wheels, scroll wheels, track balls, touch pads (e.g., one and/or two-dimensional touch sensitive touch pads), click wheels, dials, keypads, microphones, touch-sensitive GUIs, image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection block 250 can be subsumed by processor 210, or in combination therewith.

In some embodiments, input detection block 250 can detect a touch or touch gesture on one or more touch sensitive surfaces on input device 140. Input detection block 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of input device 140 may or may not utilize touch detection or touch sensing capabilities.

Input detection block 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Output control block 260 can be configured to control some output functions of input device 140, such as a number of visual output elements (e.g., LEDs, LCDs), displays, audio outputs (e.g., speakers), haptic output systems, or the like. One of ordinary skill in the art with the benefit of this disclosure would appreciate the many modifications, variations, and alternative embodiments thereof.

Although certain systems may not expressly discussed, they should be considered as part of system 200, as would be understood by one of ordinary skill in the art. For example, system 200 may include a bus system to transfer power and/or data to and from the different systems therein. It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), one or more cameras, various connection ports for connecting external devices or accessories, etc.). While system 200 is described with reference to particular blocks (e.g., input detection block 250), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 230 and/or communications block 240 may be integrated with processor(s) 210 instead of functioning as separate entities.

Embodiments of the present invention can be realized in a variety of apparatuses including electronic devices (e.g., peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any peripheral device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
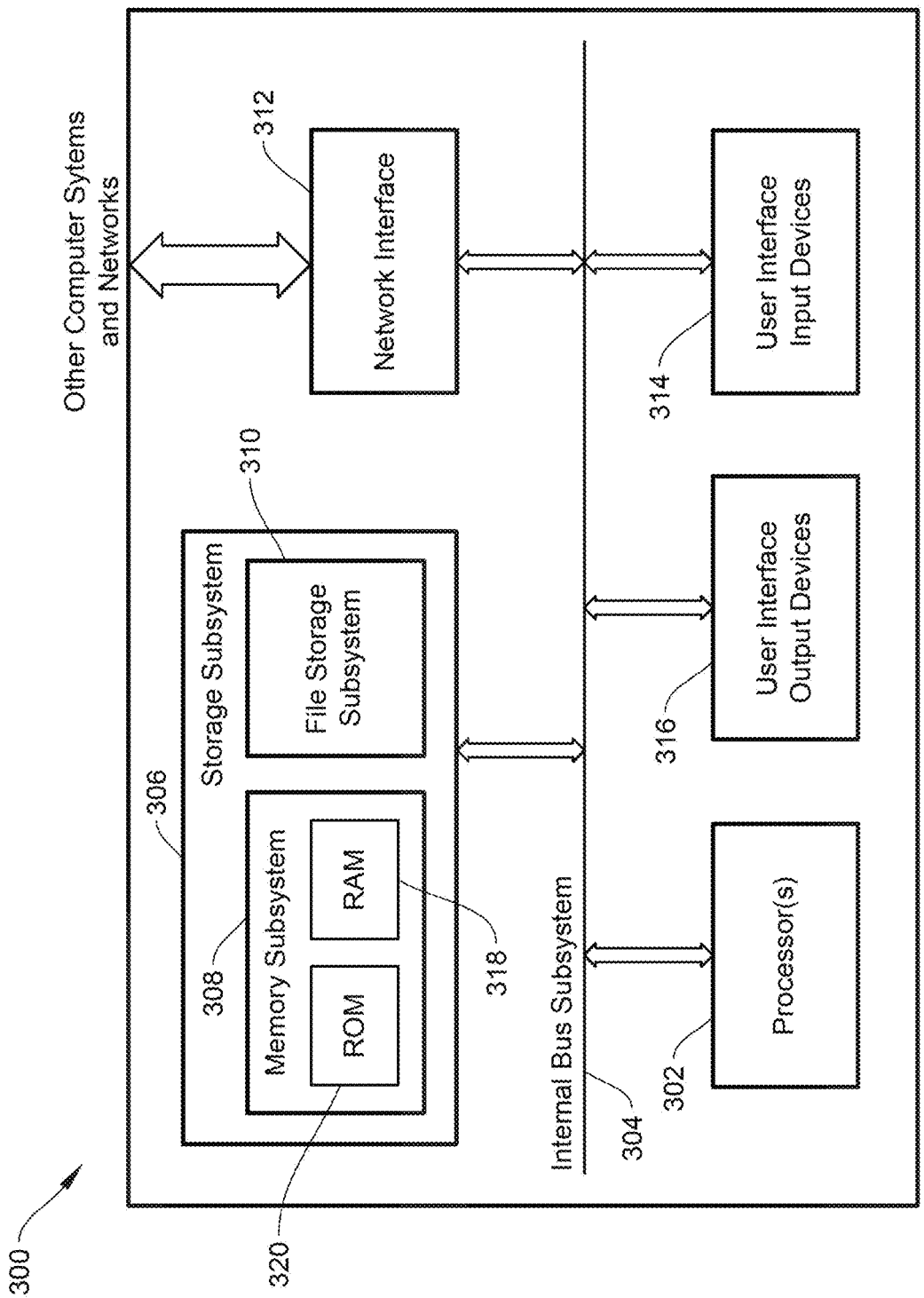
FIG. 3 is a simplified block diagram of a system for operating a computing device, according to certain embodiments.

FIG. 3 is a simplified block diagram of a system 300 for operating a computing device, according to certain embodiments. System 300 can implement some or all functions, behaviors, and/or capabilities described above that would use electronic storage or processing, as well as other functions, behaviors, or capabilities not expressly described.

System 300 includes a processing subsystem (processor(s)) 302, a storage subsystem 306, user interfaces 314, 316, and a communication interface 312. System 300 can also include other components (not explicitly shown) such as a battery, power controllers, and other components operable to provide various enhanced capabilities. In various embodiments, System 300 can be implemented in a host computing device, such as a desktop 110 or laptop computer, mobile device (e.g., tablet computer, smart phone, mobile phone), wearable device, media device, or the like, in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of input device 140, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., a keyboard for a laptop, touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of system 300 and can view and/or hear output from system 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of system 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for system 300. Processing subsystem 302 can also execute other programs to control other functions of system 300, including programs that may be stored in storage subsystem 304.

Communication interface (also referred to as network interface) 312 can provide voice and/or data communication capability for system 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., keyboard, computer mouse, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that system 300 is illustrative and that variations and modifications are possible. A host computing device can have various functionality not specifically described (e.g., voice communication via cellular telephone networks) and can include components appropriate to such functionality. While the system 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained.

Embodiments of the present invention can be realized in a variety of apparatus including electronic devices implemented using a combination of circuitry and software. Host computing devices or even peripheral devices described herein can be implemented using system 300.

Reduced Noise Balance Bar Design for a Mechanical Keyboard

Aspects of the invention relate to mechanical keyboards and corresponding key structures that operate to reduce mechanical noise, such as the audible "clicks" typically heard when a user presses a key on a mechanical keyboard. As described above, the audible clicks of standard-sized keys in a typical alphanumeric keyboard is primarily due to the key switch. Larger keys (e.g., space bar, tab, caps lock, shift, control, alt, enter, backspace, etc.) are subject to increased noise profiles due to their additional other mechanical components for key stability including slider structures and balance bar structures that are significant contributors to key noise and often louder than the key switch noise.

In large mechanical keys, such as a space bar, a balance bar structure can be used to provide structural support to the key to prevent it from tilting (e.g., like a seesaw) when the key is pressed on one end of the key cap or the other. The structural support can include two slider structures that support the balance bar in internal chambered tracks that allow the balance bar to move (e.g., rotate, slide, move) within the track as the key is depressed. As the key is depressed, the movement of the balance bar within the tracks and the impact of the various structures against various surfaces can significantly contribute to key noise.

In certain embodiments, the slider structures can be manufactured to include portions that are comprised of a rigid material for structural support and portions that are comprised of compliant material (e.g., rubber) to absorb impact and attenuate sound at locations where these problematic sources of noise occur. Rigid materials can be any suitable material that would be appreciated by one of ordinary skill in the art with the benefit of this disclosure including, but not limited to, polyoxymethylene (POM), polycarbonate (PC) with glass fiber, acrylonitrile butadiene styrene (ABS) with glass fiber, nylon polyamides, polyetheretherketone (peek), and the like with similar material properties. Compliant materials can be any suitable material that would be appreciated by one of ordinary skill in the art with the benefit of this disclosure including, but not limited to, rubber, silicone, polyurethane (PU), thermoplastic elastomer (TPE), thermoplastic rubber (TPR), liquid silicone rubber (LSR), or the like with similar material properties. Although these suitable compliant and rigid materials are not necessarily repeated again in the present disclosure, it will be understood that any of these rigid or compliant materials may be applied to any of the novel embodiments presented herein.

Aspects of this invention are directed to reducing noise caused at three locations in the slider structures, which can result in substantially quieter keys. A first source of key noise is typically caused by the keycap impacting a bottom surface, which may be a key frame, PCB, or other base structure. In some embodiments, the slider structure can include a base structure comprised of the compliant material that is oriented such that the key cap impacts the base structure when the key is depressed instead of impacting a different harder surface (e.g., key frame, PCB). The compliant material of the base structure can significantly attenuate the impact noise and reduce the overall key noise.

Another source of key noise can be caused by the balance bar moving and rotating inside the track of the slider structures, which impacts various points inside the track. In some embodiments, the track may be comprised of the compliant material, which can attenuate sounds associated with the moving and rotating of the balance bar in the track. A third source of key noise can be caused by the rebound of the key back to its undepressed state. When the key rebounds, the balance bar structure may impact a region of the chambered track when the balance bar structure returns from the depressed state to the unpressed state. The noise associated with this impact can be substantially reduced if the impact location includes the compliant material. These concepts are further described below at least with respect to FIGS. 4A-9B.

FIG. 4A shows a key structure 400 incorporating an improved balance bar structure, according to certain embodiments. Key structure 400 is coupled to a printed circuit board (PCB) 405 (which may be electrically grounded) and includes a key cap 410, a first slider structure ("first slider") 420, a second slider structure ("second slider") 430, a balance bar structure ("balance bar") 440, and a key switch 450. Key switch 450 can be any suitable key switch structure, such as a Cherry key switches or the like and is coupled to the bottom side of key cap 410. Key switch 450 is typically configured at the center of key cap 410 so that key cap 410 is balanced. First slider 420 and second slider 430 are typically configured on the ends of the key cap structure (e.g., typically less than a 10% deviation from being longitudinally equidistant from the key switch along the key cap) to provide balanced support for the key cap structure and to prevent the key cap from tilting on one side or the other when a user presses down on the key cap (e.g., imparts a torqueing force normal to the top surface of the key cap) at a location off of center, as would be appreciated by one of ordinary skill in the art with the benefit of this disclosure.

FIG. 4B shows a blown up cross-section of a slider structure 420, according to certain embodiments. In some embodiments, balance bar 440 traverses the length of key cap 410 in parallel, bends at approximately a 90 degree angle at each end, and enters into a chambered track within each slider structure. As key cap 410 is depressed and released, the balance bar structure moves up and down in a corresponding fashion as each end of the balance bar structure rotates and shifts inside the tracks of the slider structures, as shown and described in further detail below with respect to FIGS. 6A-6C.

FIG. 4B further shows how portions of the slider structures are comprised of different materials to help attenuate sound caused by key presses, as expressed above. A portion of each of the slider structures that form some or all of the chambered track can be comprised of a soft or compliant material 455 (e.g., rubber) to absorb the impacts, rubbing, rotating, and other frictional movement of the balance bar structure inside of the tracks. This can include areas inside the tracks that are contacted by the balance bar when the key cap is being depressed (e.g., lower region of the track) or when the key cap is being released (e.g., lower region of the track). The slider structures can further include soft material in areas (not shown in FIG. 4B) that the key cap strikes when the key cap is fully depressed, which can further attenuate key press noise. Portions of the slider structures that are not subject to impacts, frictional movement, contact, etc., with the balance bar structure or the key cap can be comprised of a rigid material or hard material 460 (e.g., POM) to provide architectural strength and robustness so the slider structure as a whole does not flex, shift, or otherwise move from its place during operation.

FIGS. 5A-5C show a close up, translucent, and cutaway view of a slider structure 500, respectively, according to certain embodiments. In FIG. 5A, slider structure 500 is configured to receive a balance bar structure to support a large key (e.g., a spacebar) such that key presses on any portion of the key does not result in the key tilting on one side or the other, which can cause inconsistent actuation and corresponding control signals. In operation, a keycap (not shown) is pressed, causing the actuator 510 to move down to the position shown in FIG. 5B (although some embodiments may have a shorter range of motion). Actuator 510 pushes down on the balance bar, causing the balance bar rotate as the key is pressed while still maintaining the balance of the key so that it does not tilt as the key is depressed and released. The balance bar is housed in a chambered track (visible in FIG. 5C with operation better viewable in FIGS. 6A-6C), which is contained in the main housing 505 of slider structure 500. As described above, the slider structure and balance bar structure operate to balance the key, as would be appreciated by one of ordinary skill in the art with the benefit of this disclosure. Aspects of the novelty presented herein relate to areas of the slider structures that can be formed of different materials to attenuate noise caused by key presses ("clicks" and key related noises) and maintain the structural integrity of the key support system. The actuator 510 and main housing 505 may be comprised of a rigid material to provide structural support to the slider structure.

FIG. 5B shows external portions of the slider structure as translucent to show interior features including a chambered track region where an end of the balance bar structure is housed and supported. FIG. 5C shows a cross section of the interior portions to expose the chambered track section where the end of the balance bar structure is housed. FIGS. 5A-5C further show how the chambered track, the balance bar landing area, the balance bar rebound area or any other areas that may be impacted or subject to sliding, rotation, or other frictional contact from the balance bar or key cap can be comprised of the soft material (shown in gray) for soft contact points that can absorb impact and attenuate noise associated with those impacts or frictional forces as the balance bar moves when the key cap and corresponding slider structure is depressed. The other areas (shown in speckled white) can provide structural integrity, as described above. The slider structure may be manufactured in any suitable manner to produce the soft and rigid materials including a dual-shot injection molding process or a 3D printing process, as would be appreciated by one of ordinary skill in the art with the benefit of this disclosure.

Figure 6A:
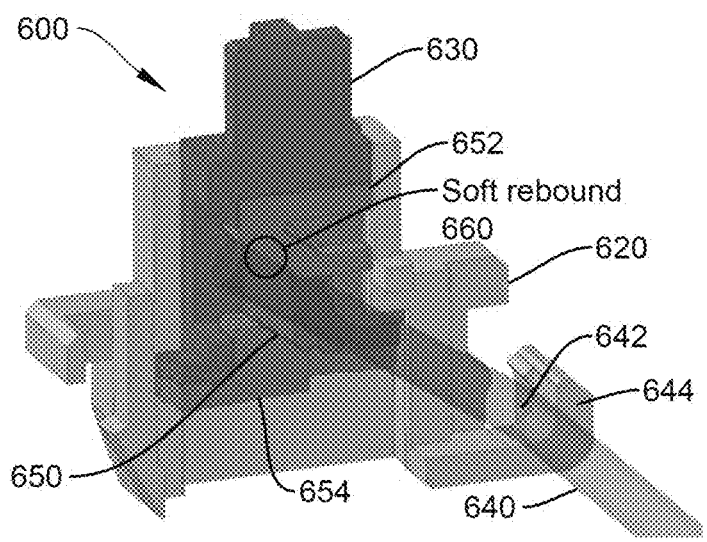
FIGS. 6A-6C show a slider structure in operation as a key is pressed from an initial unpressed state to a fully depressed state, according to certain embodiments.
Figure 6B:
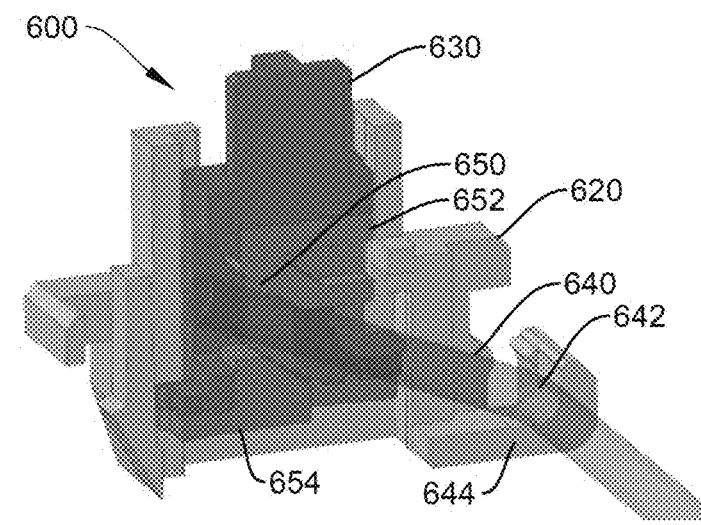
Figure 6C:
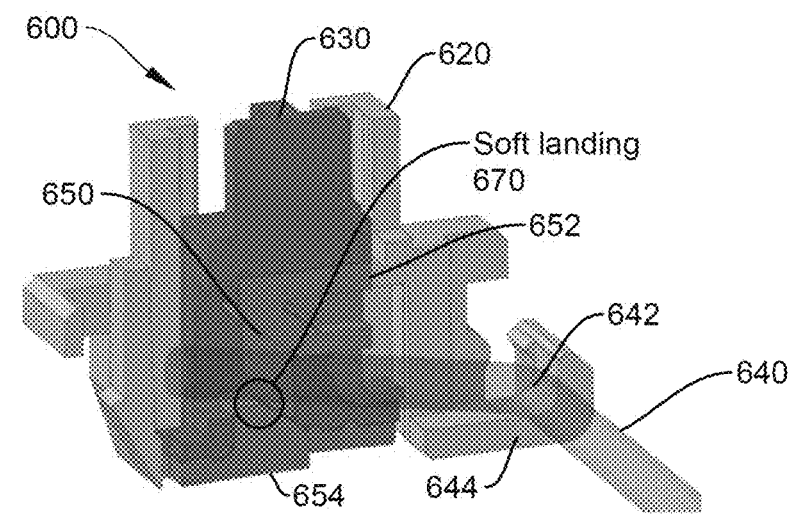

FIGS. 6A-6C show a slider structure 600 in operation as a key (e.g., space bar) is pressed from an initial non-pressed state to a fully depressed state, according to certain embodiments. In FIG. 6A, the slider structure 600 is in a top-most position that corresponds to when the key (e.g., space bar) is not pressed (e.g., no pressing force is being applied to the key cap and the slider structure and corresponding key structure is at rest). As described above, the balance bar 640 traverses the length of the key and bends at approximately 90 degrees at each slider structure forming a corner 642 and continues with each end of the balance bar entering into a corresponding chambered track 650 within each slider structure. The balance bar 640 is supported by a cradle 644 of the slider structure 600, which allows the balance bar 640 to rotate at cradle 644 as the key and slider structure are depressed, which causes the end of the balance bar 640 to move up and down along an arc as the slider structure is depressed. Referring back to FIG. 6A, the slider structure 600 includes a main body 620 (also referred to as a housing or chassis) that is typically formed of a rigid material (e.g., POM) and can be secured to a key frame, a PCB, or other structure that can secure the slider structure in place during operation. The depressible portion of the slider structure slides up and down relative to main body 620 and can include depressible actuator 630 and track 650. In operation, as a user presses a key cap on an extended key (e.g., space bar), the force imparted on the key cap is transferred to depressible actuator 630 causing the entire slider structure to move down, including the chambered track 650 that houses the end of the balance bar structure. Referring to FIG. 6A, the end of the balance bar structure 640 is pressed against an upper region 652 of track 650. As the user presses the key cap down, the slider structure (actuator 630 and track 650) moves down, causing upper region 652 to push down on balance bar 640. This causes balance bar 640 to rotate downwards in an arc relative to the corner 642 and the rest of balance bar 640 that longitudinally traverses the length of the key cap, which can produce various impacts (e.g., the slider bar rattling within track 650 as the slider structure is depressed/released, friction-based noise as the slider bar slides, rotates, and moves within the track 650 during operation, etc). The slider structure can continue to be depressed until it bottoms out, which may be when it comes into contact with a bottom portion of the main body 620, a key frame, an underlying PCB, or other surface or feature, as shown in FIG. 6C.

As described above, one source of key noise is typically caused by the keycap and/or slider structure impacting a bottom surface. In some embodiments, the slider structure can include a base structure comprised of the compliant material that is oriented such that the key cap impacts the base structure when the key is depressed instead of impacting a different harder surface (e.g., key frame, PCB), as described above at least with respect to FIG. 5A-5C. The compliant material of the base structure can significantly attenuate the impact noise and reduce the overall key noise. Referring to FIGS. 6A-6C, the compliant material my include portions in track 650 and around track 650 including upper region 652 and bottom region 654 and additionally areas that are subject to an impact when the key is depressed (e.g., the balance bar 640 impacts a bottom surface 670) and when the key is released (e.g., rebound point 660 of upper region 652) and returns to the initial non-depressed state. Thus, compliant material in bottom region 654 may allow for a "soft landing" of the slider structure, which can substantially attenuate any noise caused by the "bottoming out" condition (e.g., the key being fully depressed). In some embodiments, the slider structures are configured such that they bottom out before the key switch. In such cases, impact noise caused by the key switch bottom out can be reduced or eliminated as the key switch will not be able to be depressed to the point of bottoming out. Thus, some extended key structures (e.g., space bar, tab key, etc.) with novel slider structures and a key switch may be quieter than a normal key with only a key switch because the novel slider structure prevents the key switch from bottoming out impacts, as shown and further described below with respect to FIGS. 9A-9B.

A second source of key noise can be caused by the balance bar moving, rattling, impacting, sliding, rotating, etc., inside the track of the slider structures. In some embodiments, the track itself can be comprised of the compliant material, which can attenuate sounds associated with the moving, rattling, impacting, and rotating of the balance bar in the track.

A third source of key noise can be caused by the rebound of the key back to its undepressed state. When the key rebounds, the balance bar structure may impact a region of the chambered track (e.g., upper region 652 at rebound point 660) when the balance bar structure returns from any depressed state to the non-pressed state. The noise associated with this impact can be substantially reduced if the impact location is comprised of a compliant material to absorb the impact. Thus, the typical sources of the most noise in a key structure utilizing a balance bar architecture can be substantially reduced by incorporating a compliant material at locations where impacts, rubbing, rotating, or other mechanical contacting occurs.

Figure 7C:
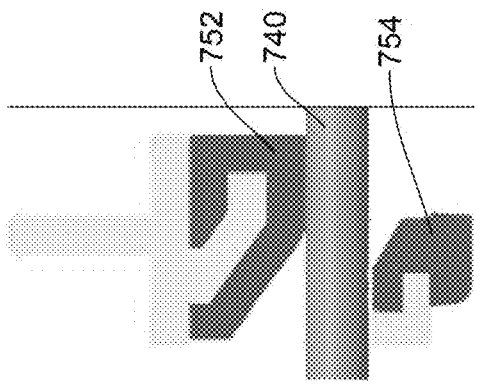
FIGS. 7B and 7C show simplified cross-sections of a side view of a slider structure to show how the balance bar may impact different portions of the track during operation of the key structure, according to certain embodiments.
Figure 7B:
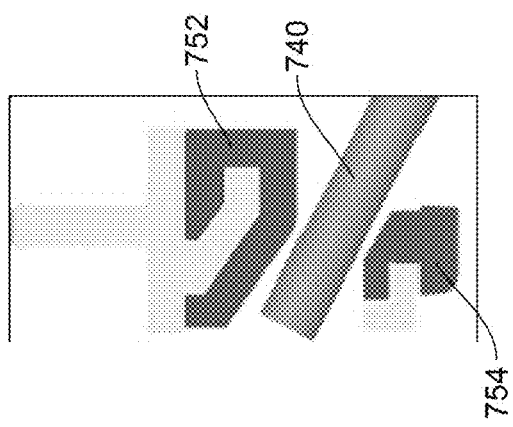
Figure 7A:
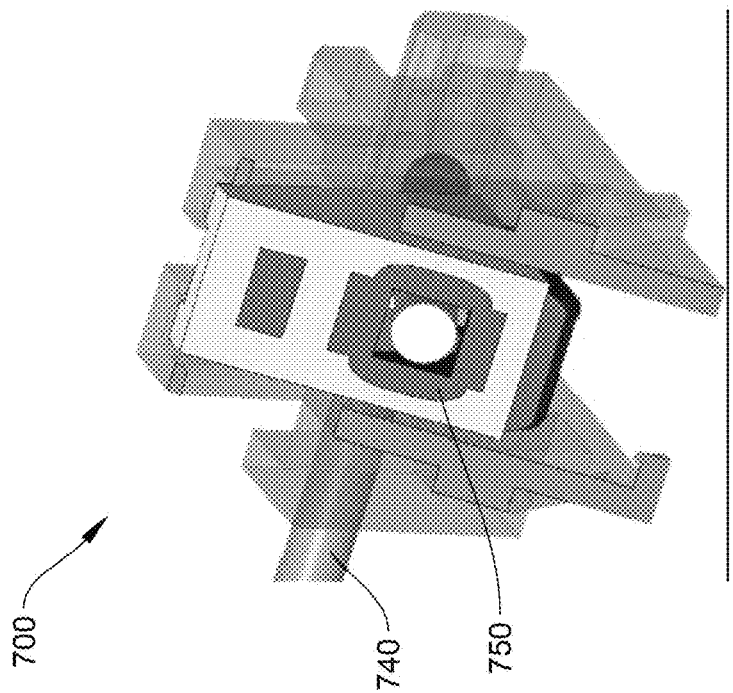
FIG. 7A shows a cross-sectional view of a slider structure, according to certain embodiments.

FIG. 7A shows a cross-sectional view of a slider structure, according to certain embodiments. The balance bar structure 740 can be configured within the track 750, as shown. Track 750 can be comprised of the compliant material, which may include the entire chambered track 750 that surrounds the balance bar structure, or a portion thereof. FIGS. 7B and 7C show simplified cross-sections of a side view of the slider structure to show how the balance bar may impact different portions of the track during operation of the key structure. In FIG. 7B, as the key is depressed, balance bar structure moves (e.g., the end of balance bar structure 750 may rotate, slide, vibrate, etc.) within track 750 and can impact bottom region 754 when the key cap is sufficiently depressed. This impact can contribute to the "click" sound in addition to any rattling, frictional sliding, etc., that can occur as the balance bar moves within the track as the key is depressed. In some embodiments, the track can be comprised of a compliant material to absorb the impact and reduce the friction that may occur in the track during the key press event. In FIG. 7C, as the key is released from a depressed state, balance bar structure moves (e.g., the end of balance bar structure 750 may rotate, slide, vibrate, etc.) within track 750 and impacts upper region 752. This impact can also contribute the "click" sound in addition to any rattling, frictional sliding, etc., that can occur as the balance bar moves within the track as the key is released.

Typical Non-Limiting Embodiments

In some embodiments, a keyboard can include a key frame (e.g., PCB 405) and a key structure 400 coupled to the key frame 405. The key structure can include a key cap 410 having a top surface and bottom surface opposite the top surface, a depressible key switch 450 coupled to the bottom surface of the key cap, a depressible first slider 410 having a first track, the first slider coupled to the bottom surface of the key cap, and a depressible second slider 420 having a second track, the second slider coupled to the bottom surface of the key cap. In some aspects, each of the first and second sliders can include a first portion comprised of a rigid material and a second portion comprised of a compliant material. The keyboard can include a balance bar structure 440 including a first end coupled to the first slider and configured to move (e.g., rotate, slide, etc.) within the first track as the key structure is depressed or released and a second end coupled to the second slider and configured to rotate within the second track as the key structure is depressed or released. The balance bar structure can be configured to provide a structural support that prevents the key cap from tilting as the key structure is depressed in response to a force applied at any point on the top surface of the key cap. When the key structure is fully depressed, the keycap can impact a bottom region of the second portion of each of the first and second sliders. The compliant material absorbs energy from the impact such that a first sound caused by the impact of the key cap with the bottom region is attenuated.

In certain embodiments, the first track is a mid-region of the second portion of the first slider, the second track is a mid-region of the second portion of the second slider, and the compliant material attenuates sound caused by the movement (e.g., rotation, sliding, moving, etc.) of the balance bar structure within the first and second tracks. In some cases, a lubricant (e.g., grease, oil, etc.) can be added to the tracks to reduce friction of the movement of the balance bar within the tracks and further attenuate sound caused by the movement of the balance bar structure within the first and second tracks. In some aspects, a biasing mechanism (e.g., spring) of the depressible key switch (e.g., Cherry switch) provides a restoring force configured to cause the key cap and the balance bar structure to return from a depressed state to an unpressed state. In such cases, the balance bar structure may impact an upper region of the second portion of the first and second sliders when the balance bar structure returns from the depressed state to the unpressed state, and the compliant material attenuates sound caused by the impact of the balance bar structure against the upper region of the second portion of the first and second sliders when the balance bar structure returns from the depressed state to the unpressed state. In some aspects, the rigid material can be a polyoxymethylene (POM) or other stiff material, and the compliant material can be a rubber compound or other pliable material. The key switch is typically centered under the key cap, and the first and second sliders are positioned at opposite ends of the key cap and substantially equidistant to the key switch. The first and second portions of each slider can form the key structure, which may be manufactured using a dual shot injection molding process, a 3D printing process, or other suitable method of manufacturing.

In further embodiments, a slider structure for a keyboard comprises a frame, a depressible actuator disposed in the frame, and a chambered track configured to receive a balance bar structure, the balance bar structure operable to provide a structural support that resists a key cap coupled to the frame from tilting as a force applied at any point on the top surface of the key cap. When the depressible actuator is depressed, the depressible actuator may be operable to push the balance bar structure causing the balance bar structure to rotate within the chambered track, where the frame and depressible actuator are comprised of a rigid material (e.g., POM) and the chambered track is comprised of a compliant material (e.g., rubber) that attenuates sound caused by the rotating of the balance bar structure within the chambered track. In some aspects, when the depressible actuator is fully depressed, the keycap impacts a base structure comprised of the compliant material and the compliant material of the base structure absorbs energy from the impact such that a sound caused by the impact of the key cap with the base structure is attenuated. In some aspects, a biasing mechanism of a depressible key switch coupled to the key cap provides a restoring force configured to cause the key cap and the balance bar structure to return from a depressed state to an unpressed state, where the balance bar structure impacts a region of the chambered track when the balance bar structure returns from the depressed state to the unpressed state, and where the compliant material attenuates sound caused by the impact of the balance bar structure against the region of the chambered track when the balance bar structure returns from the depressed state to the unpressed state.

Performance Characteristics of Key Structures Utilizing the Novel Slider Structure The following graphs illustrate the various improved performance characteristics associated with the novel slider structures described herein. The slider structures (e.g., as shown in FIGS. 4-7C) can significantly attenuate key click noise typically associated with keys that utilize a balance bar structure (e.g., space bar, tab, caps lock, shift, backspace, enter, etc.). In particular, the higher frequencies (e.g., 5 kHz-10 kHz) can be attenuated the most, which is typically the most noticeable to users (as opposed to lower frequencies, such as 0<5 kHz) and often the most irritating and annoying. By attenuating the "clickiness" of a key, particularly in the higher audio band, users experience the key as significantly quieter and preferable over conventional key structures.

Figure 8:
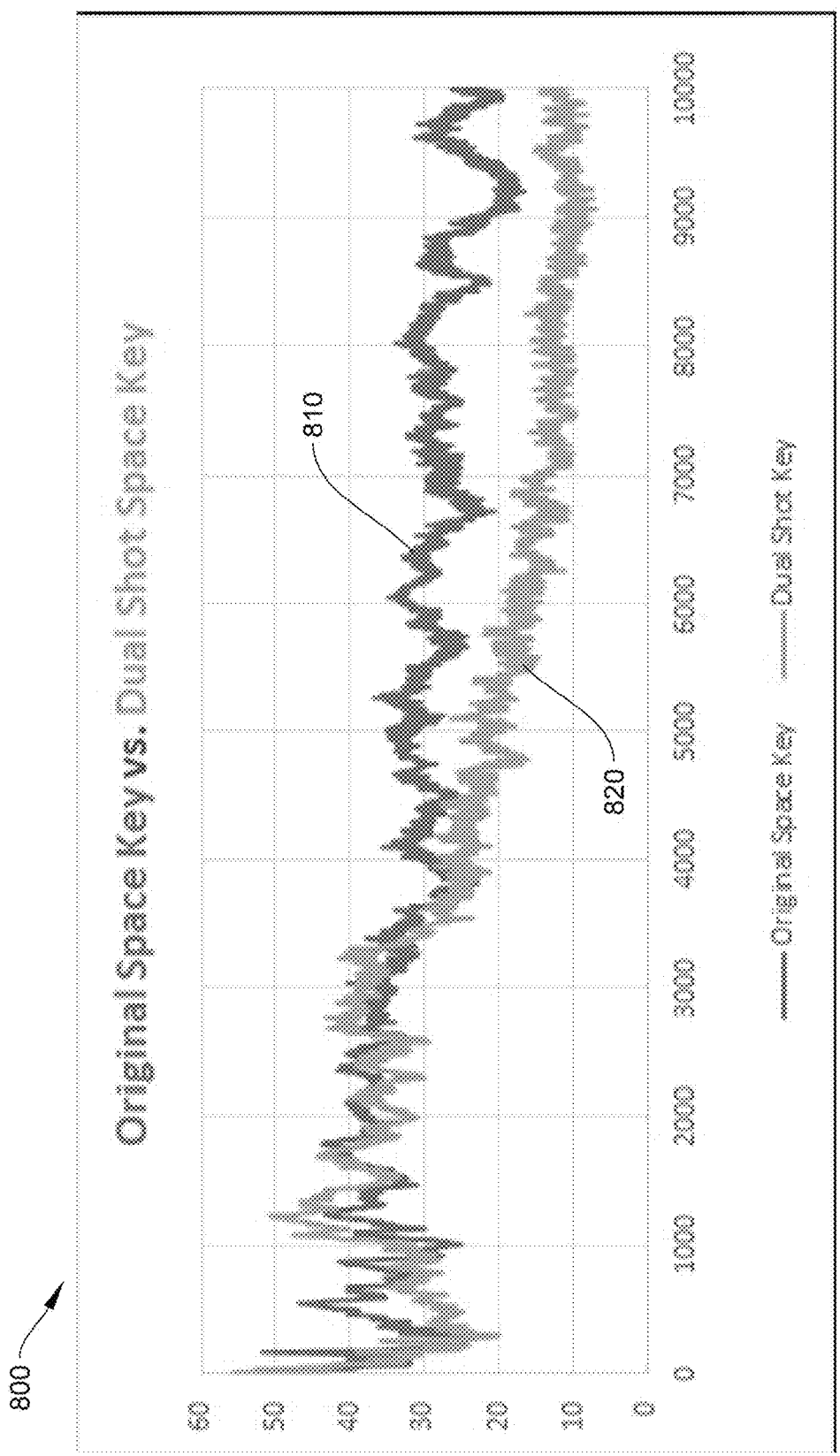
FIG. 8 is a graph showing noise distribution of a key press for a conventional space bar key and a novel space bar key using aspects of the invention.

FIG. 8 is a graph 800 showing noise distribution of a key press for a conventional space bar key and a novel space bar key using aspects of the invention. Line 810 corresponds to noise characteristics of a typical space bar key of a typical computer keyboard over an audio spectrum including 0-10 kHz, which includes the typical, practical audible range for a human. The noise, as described above, is mostly attributed to the "click" sound associated to a key press in a keyboard. Line 810 shows that noise levels vary around 30-40 dB at lower frequencies (e.g., 1-5 kHz) and slightly decrease to approximately 20-30 dB at higher frequencies (e.g., 5 kHz-10 kHz). Line 820 corresponds to noise characteristics of a space bar key using novel slider structures, as described above at least with respect to FIGS. 4A-7C (e.g., using dual shot rubber-support slider structures). Line 820 shows that noise levels vary around 30-40 dB at lower frequencies (e.g., 1-5 kHz) and substantially decrease to approximately 10-15 dB at higher frequencies (e.g., 5 kHz-10 kHz), which is a marked improvement in the band of audio frequencies that users find most noticeable in the "clickiness" of a key and often corresponds primarily with the balance bar rattling inside the slider structures. Note that this performance can be further appreciated as the background noise recorded in this operation approached 12 dB.

Figure 9A:
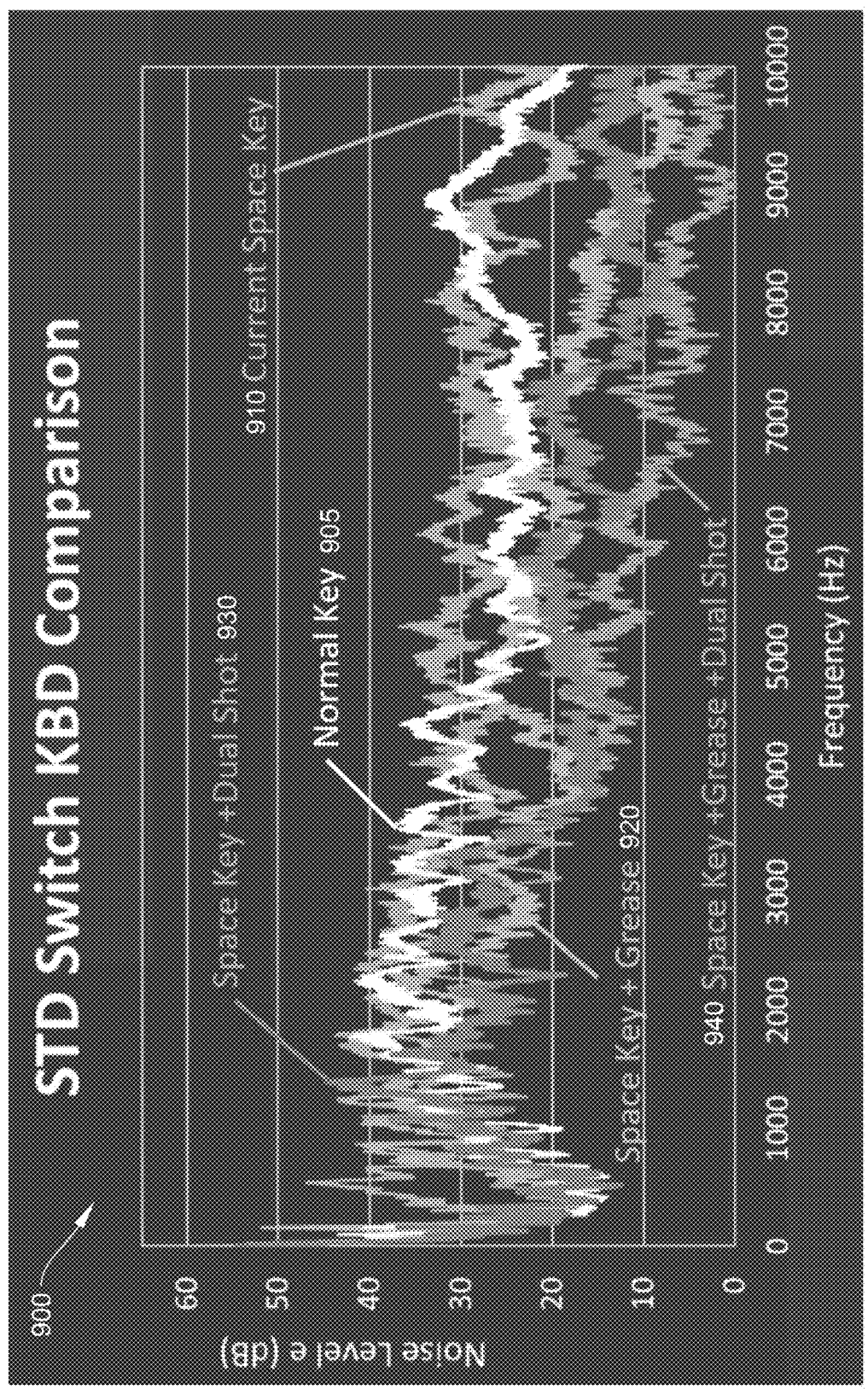
FIG. 9A is a graph showing key press noise levels over an audio spectrum for standard keys and extended length keys with different types of balance bar structures and a standard-type key switch.

FIG. 9A is a graph 900 showing key press noise levels over an audio spectrum (0-10 kHz) for standard keys and extended length keys with different types of balance bar structures and a standard-type key switch. Graph 900 includes key press noise levels (due to "clicks") for a standard normal sized key (e.g., square keys, such as keys "a," "s," "d," "f") 905, a space key 910 with a conventional balance bar structure, a space key with a conventional balance bar structure and with grease in the track of its slider structures 920, a space key 930 with novel slider structures (e.g., like FIGS. 4A-4C), and a space key with novel slider structure and with grease in the track of its slider structures 940.

A normal sized key does not include a balance bar structure and its primary source of key press noise is the standard key switch. The noise level distribution for a normal sized key over the audio spectrum, as shown in line 905, varies around 30-40 dB at lower frequencies (e.g., 1 kHz-5 kHz) and slightly decreases to approximately 20-30 dB at higher frequencies (e.g., 5 kHz-10 kHz).

As described above, a conventional space bar includes both a key switch and a conventional balance bar structure with slider structures, which both contribute to key press noise. The noise level distribution for a conventional space bar over the audio spectrum, as shown in line 910, varies around 30-40 dB at lower frequencies (e.g., 1 kHz-5 kHz)

and slightly decreases to approximately 20-30 dB at higher frequencies (e.g., 5 kHz-10 kHz).

Adding grease to the chambered track in a slider structure can reduce the friction of the balance bar inside the track during operation, which can result in reduced noise during a key press. The noise level distribution over the audio spectrum for a conventional space bar with grease added to the chambered track, as shown in line 920, varies around 30-40 dB at lower frequencies (e.g., 1 kHz-2 kHz), 20-30 dB at mid-range frequencies (e.g., 4 kHz-6 kHz), and markedly decreases to approximately 10-20 dB at higher frequencies (e.g., 8 kHz-10 kHz). Thus, adding grease to the track of a slider structure can significantly reduce key press noise, particular at the higher frequency range, which user's tend to notice more than lower frequency noise.

The novel slider structures described herein may be comprised of at least two materials including a rigid material (e.g., POM) to provide structural support to the slider structure, and a compliant material (e.g., rubber) to absorb impacts and frictional movement of the balance bar within the tracks of the slider structures, and impacts caused by the balance bar on the bottom and top of the tracks during key press and release events, respectively (e.g., see FIGS. 4A-7C), which can significantly attenuate noise associated with said impacts and frictional movement. The slider structure may be manufactured with rigid and compliant materials via a dual shot injection mold process, 3D printing process, or other suitable method of manufacturing. Referring back to FIG. 9A, the noise level distribution over the audio spectrum for a space bar with a novel slider structure with dual shot construction, as shown in line 930, varies around 15-45 dB at lower frequencies (e.g., 1 kHz-2 kHz), markedly decreases to 15-20 dB at mid-range frequencies (e.g., 4 kHz-6 kHz), and further decreases to approximately 10-20 dB at higher frequencies (e.g., 8 kHz-10 kHz).

The noise level distribution over the audio spectrum for a space bar with a novel slider structure with dual shot construction and grease, as shown in line 940, varies around 25-35 dB at lower frequencies (e.g., 1 kHz-2 kHz), markedly decreases to 15-20 dB at mid-range frequencies (e.g., 4 kHz-6 kHz), and further substantially decreases to approximately 2-10 dB at higher frequencies (e.g., 8 kHz-10 kHz), which is the quietest above 5 kHz.

Figure 9B:
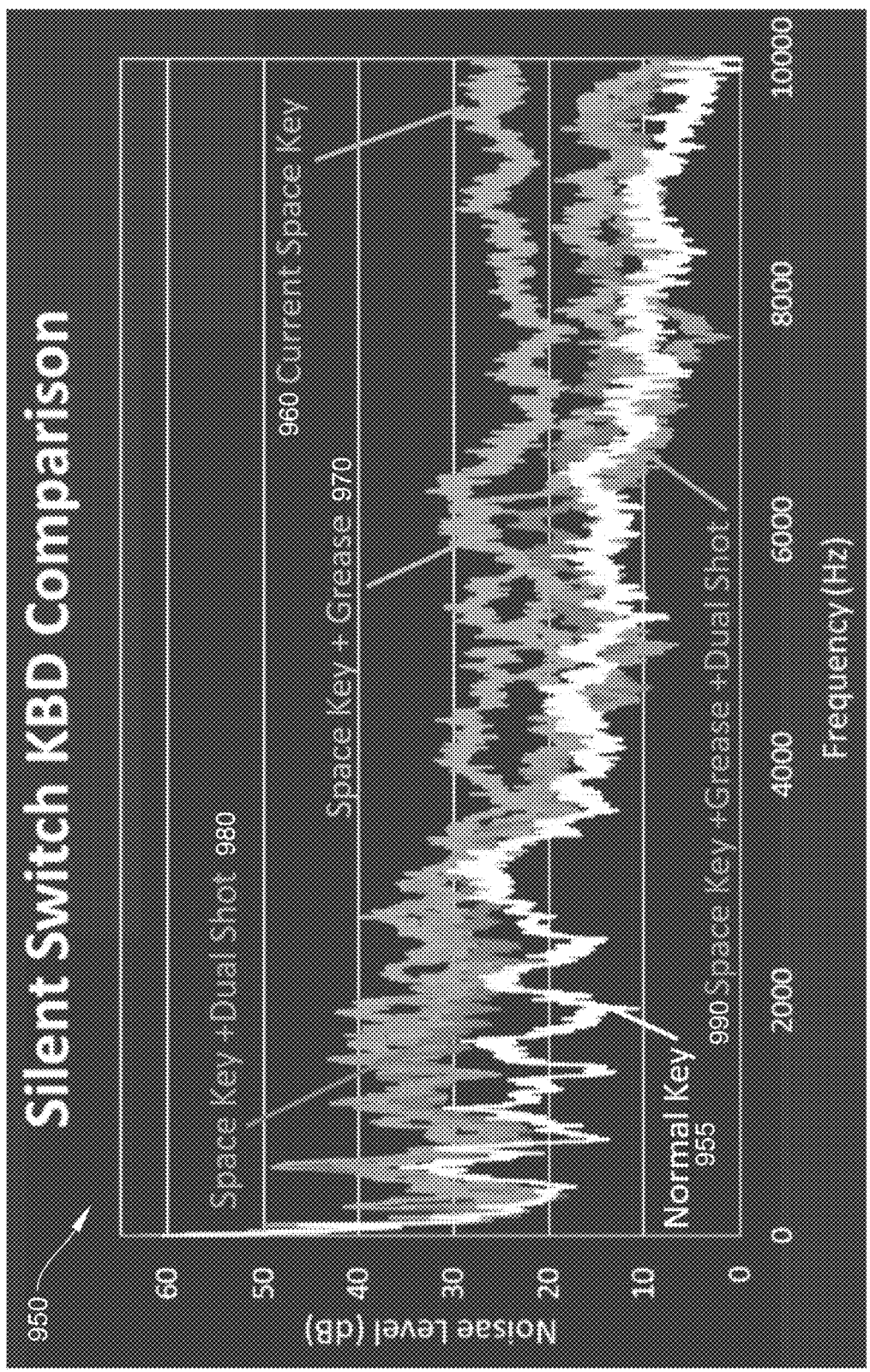
FIG. 9B is a graph showing key press noise levels over an audio spectrum for standard keys and extended length keys with different types of balance bar structures and a silent-type key switch.

FIG. 9B is a graph 950 showing key press noise levels over an audio spectrum (0-10 kHz) for standard keys and extended length keys with different types of balance bar structures and a silent-type key switch. Silent-type key switches produce significantly less noise than their standard counterparts. As such, the overall noise produced by normal keys and extended keys is lower to make for significantly quieter keys. Graph 950 includes key press noise levels (due to "clicks") for a standard normal sized key (e.g., square keys, such as keys "a," "s," "d," "f") 955, a space key 960 with a conventional balance bar structure, a space key with a conventional balance bar structure and with grease in the track of its slider structures 970, a space key 980 with novel slider structures (e.g., like FIGS. 4A-4C), and a space key with novel slider structure and with grease in the track of its slider structures 990.

The noise level distribution for a normal sized key with a silent key switch over the audio spectrum, as shown in line 955, varies around 20-40 dB at lower frequencies (e.g., 1 kHz-5 kHz), 10-20 dB at mid-range frequencies (e.g., 4 kHz-6 kHz) and substantially decreases to approximately 3-10 dB at higher frequencies (e.g., 8 kHz-10 kHz). The noise level distribution for a conventional space bar with a silent key switch, as shown in line 960, varies around 30-35 dB at lower frequencies (e.g., 1 kHz-5 kHz), 20-30 dB at mid-range frequencies (e.g., 4 kHz-6 kHz) and roughly stays the same at approximately 20-30 dB at higher frequencies (e.g., 5 kHz-10 kHz). The noise level distribution over the audio spectrum for a conventional space bar with grease added to the chambered track, as shown in line 970, varies around 30-40 dB at lower frequencies (e.g., 1 kHz-2 kHz), 20-30 dB at mid-range frequencies (e.g., 4 kHz-6 kHz), and markedly decreases to approximately 10-20 dB at higher frequencies (e.g., 8 kHz-10 kHz). For a space bar with a novel slider structure with dual shot construction, as shown in line 980, the noise level varies around 25-40 dB at lower frequencies (e.g., 1 kHz-2 kHz), markedly decreases to 10-20 dB at mid-range frequencies (e.g., 4 kHz-6 kHz), and further decreases to approximately 5-15 dB at higher frequencies (e.g., 8 kHz-10 kHz).

The noise level distribution over the audio spectrum for a space bar with a novel slider structure with dual shot construction and grease, as shown in line 990, varies around 20-45 dB at lower frequencies (e.g., 1 kHz-2 kHz), markedly decreases to 8-20 dB at mid-range frequencies (e.g., 4 kHz-6 kHz), and further substantially decreases to approximately 2-10 dB at higher frequencies (e.g., 8 kHz-10 kHz), which is the quietest above 5 kHz. Thus, there is a clear and substantial reduction in the high frequency component of key noise (e.g., 5 kHz-10 kHz) for embodiments employing the novel slider switch and balance bar structure, which can reach over 20 dB in noise attenuation, and in some cases an additional 5-10 dB with the addition of the grease in the chambered tracks. The use of the novel slider structures can result in significant costs savings as it can be substantially cheaper to implement the novel slider structures in an extended key instead of comparatively expensive "silent" key switches, which can still result in marked reductions in overall key press noise, as shown in FIG. 9A.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

What is claimed is:

1. A keyboard comprising:
a key frame; and
a key structure coupled to the key frame, the key structure including:
a key cap having a top surface and bottom surface opposite the top surface;
a depressible key switch coupled to the bottom surface of the key cap;
a depressible first slider having a first track, the first slider coupled to the bottom surface of the key cap;
a depressible second slider having a second track, the second slider coupled to the bottom surface of the key cap,
wherein each of the first and second sliders include:
a first portion comprised of a rigid material; and
a second portion comprised of a compliant material; and
a balance bar structure including:
a first end coupled to the first slider and configured to slide and rotate within the first track as the key structure is depressed or released; and
a second end coupled to the second slider and configured to slide and rotate within the second track as the key structure is depressed or released,
wherein the balance bar structure is configured to provide a structural support that prevents the key cap from tilting as the key structure is depressed in response to a force applied at any point on the top surface of the key cap, and
wherein when the key structure is fully depressed, the keycap impacts a bottom region of the second portion of each of the first and second sliders, and
wherein the compliant material absorbs energy from the impact such that a first sound caused by the impact of the key cap with the bottom region is attenuated.

2. The keyboard of claim 1 wherein the first track is a mid-region of the second portion of the first slider, wherein the second track is a mid-region of the second portion of the second slider, and wherein the compliant material attenuates sound caused by a moving and rotating of the balance bar structure within the first and second tracks.

3. The keyboard of claim 1 wherein a biasing mechanism of the depressible key switch provides a restoring force configured to cause the key cap and the balance bar structure to return from a depressed state to an unpressed state,
wherein the balance bar structure impacts an upper region of the second portion of the first and second sliders when the balance bar structure returns from the depressed state to the unpressed state, and
wherein the compliant material attenuates sound caused by the impact of the balance bar structure against the upper region of the second portion of the first and second sliders when the balance bar structure returns from the depressed state to the unpressed state.

4. The keyboard of claim 1 wherein the first portion is comprised of a polyoxymethylene (POM).

5. The keyboard of claim 1 wherein the second portion is comprised of a rubber compound.

6. The keyboard of claim 1 wherein the key switch is centered under the key cap,
wherein the first slider is positioned at a first end of the key cap, and
wherein the second slider is positioned at a second end of the key cap, the first and second sliders being substantially equidistant from the key switch.

7. The keyboard of claim 1 wherein the key switch is a Cherry-type switch.

8. The keyboard of claim 1 wherein the first portion and the second portion of the first and second sliders is formed via a dual shot injection molding process.

9. The keyboard of claim 1 wherein the first portion and the second portion of the first and second sliders is formed via a 3D printing process.

10. The keyboard of claim 1 further comprising a lubricant in the first and second track.

11. A key structure for a keyboard, the key structure comprising:
a key cap having a top surface and bottom surface opposite the top surface;
a depressible first slider having a first track, the first slider coupled to the bottom surface of the key cap;

a depressible second slider having a second track, the second slider coupled to the bottom surface of the key cap,
   wherein each of the first and second sliders include:
      a first portion comprised of a rigid material; and
      a second portion comprised of a compliant material; and
   a balance bar structure including:
      a first end coupled to the first slider and configured to rotate within the first track as the key structure is depressed or released;
      a second end coupled to the second slider and configured to rotate within the second track as the key structure is depressed or released,
      wherein the balance bar structure is configured to provide a structural support that prevents the key cap from tilting as the key structure is depressed in response to a force applied at any point on the top surface of the key cap, and
      wherein when the key structure is fully depressed, the keycap impacts a bottom region of the second portion of each of the first and second sliders, and
      wherein the compliant material absorbs energy from the impact such that a first sound caused by the impact of the key cap with the bottom region is attenuated.

12. The key structure of claim 11 wherein the first track is a mid-region of the second portion of the first slider, wherein the second track is a mid-region of the second portion of the second slider, and wherein the compliant material attenuates sound caused by the rotating of the balance bar structure within the first and second tracks.

13. The key structure of claim 11 wherein a biasing mechanism of a depressible key switch coupled to the key cap provides a restoring force configured to cause the key cap and the balance bar structure to return from a depressed state to an unpressed state
   wherein the balance bar structure impacts an upper region of the second portion of the first and second sliders when the balance bar structure returns from the depressed state to the unpressed state, and
   wherein the compliant material attenuates sound caused by the impact of the balance bar structure against the upper region of the second portion of the first and second sliders when the balance bar structure returns from the depressed state to the unpressed state.

14. The key structure of claim 11 wherein the first portion is comprised of POM.

15. The key structure of claim 11 wherein the second portion is comprised of a rubber compound.

16. A slider structure for a keyboard, the slider structure comprising:
   a housing;
   a depressible actuator disposed in the housing; and
   a chambered track configured to receive a balance bar structure, the balance bar structure operable to provide a structural support that resists a key cap coupled to the housing from tilting as a force is applied at any point on a top surface of the key cap,
   wherein when the depressible actuator is depressed, the depressible actuator is operable to push the balance bar structure causing the balance bar structure to rotate within the chambered track,
   wherein the frame and depressible actuator are comprised of a rigid material,
   wherein the chambered track is comprised of a compliant material that attenuates sound caused by the rotating of the balance bar structure within the chambered track.

17. The slider structure of claim 16 wherein when the depressible actuator is fully depressed, the keycap impacts a base structure comprised of the compliant material, and
   wherein the compliant material of the base structure absorbs energy from the impact such that a sound caused by the impact of the key cap with the base structure is attenuated.

18. The slider structure of claim 16 wherein a biasing mechanism of a depressible key switch coupled to the key cap provides a restoring force configured to cause the key cap and the balance bar structure to return from a depressed state to an unpressed state,
   wherein the balance bar structure impacts a region of the chambered track when the balance bar structure returns from the depressed state to the unpressed state, and
   wherein the compliant material attenuates sound caused by the impact of the balance bar structure against the region of the chambered track when the balance bar structure returns from the depressed state to the unpressed state.

19. The slider structure of claim 16 wherein the rigid material is a polyoxymethylene (POM).

20. The slider structure of claim 17 wherein the compliant material is a rubber compound.

\* \* \* \* \*